UNITED STATES PATENT OFFICE.

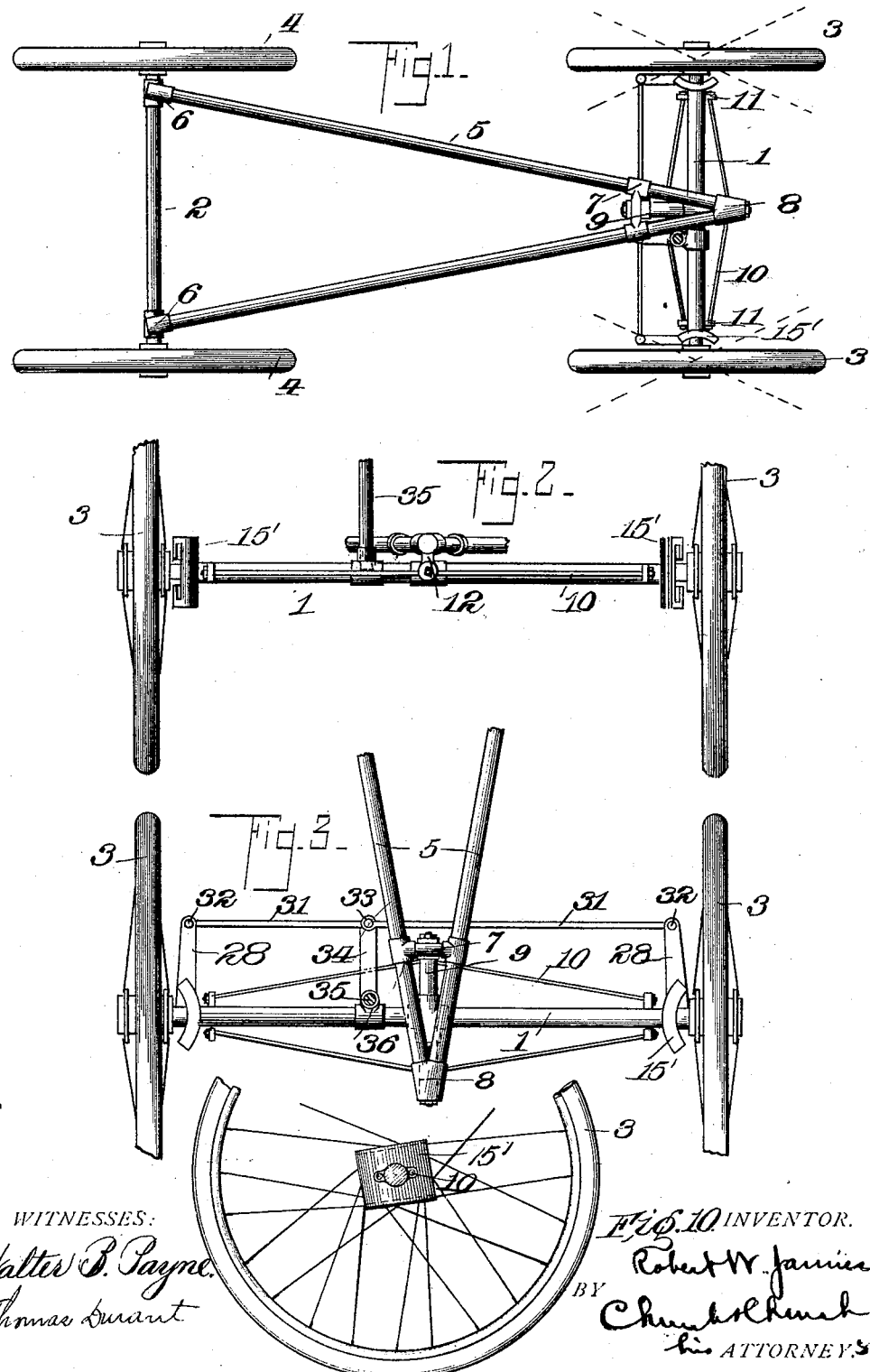

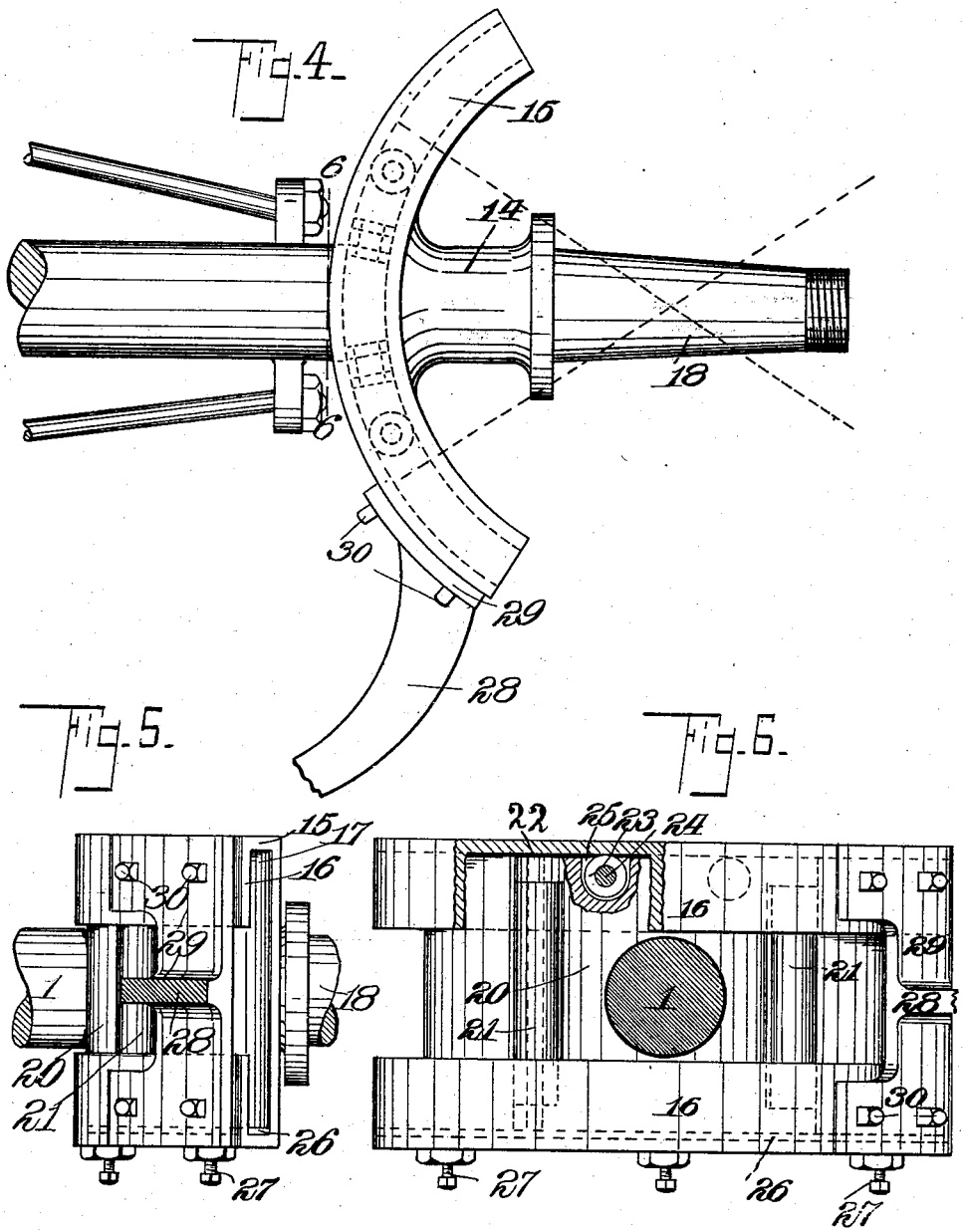

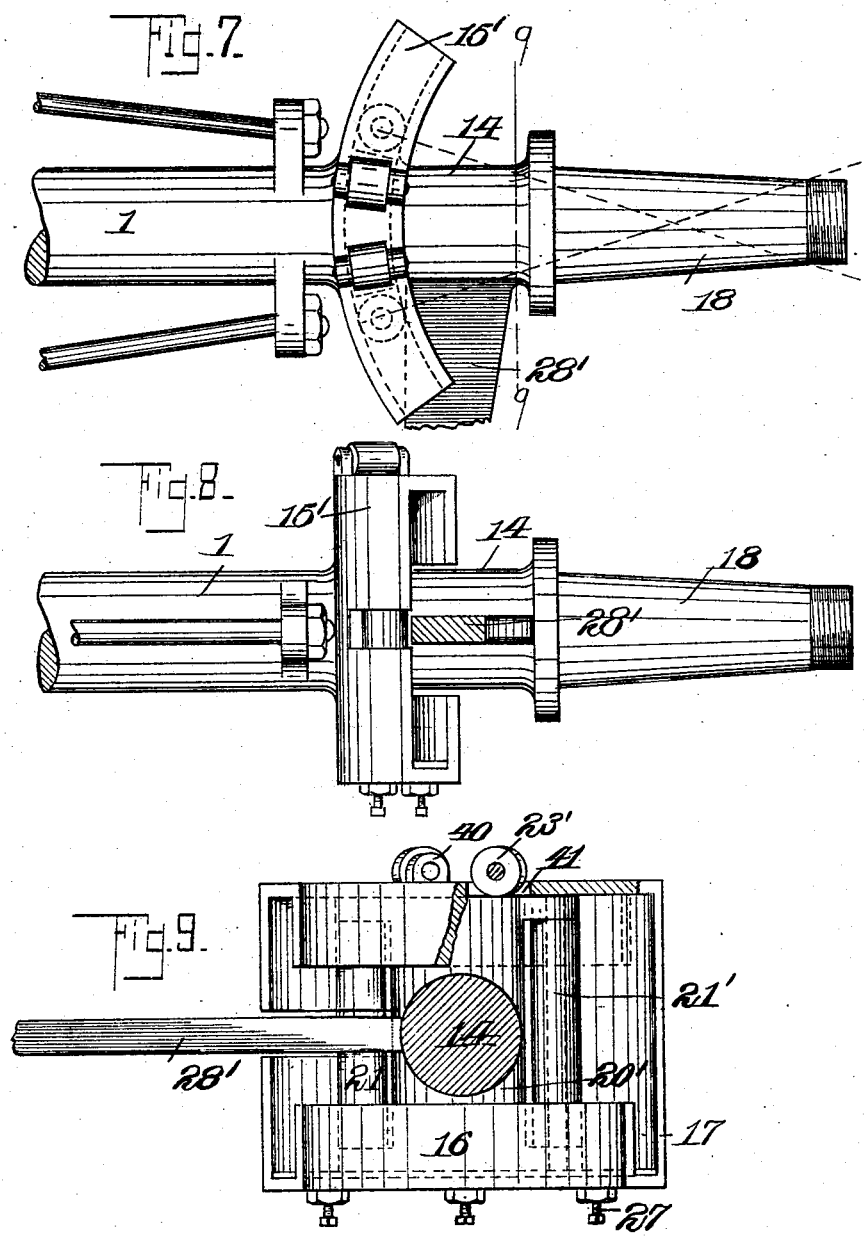

ROBERT W. JAMIESON, OF ROCHESTER, NEW YORK.

RUNNING-GEAR FOR VEHICLES.

SPECIFICATION forming part of Letters Patent No. 636,999, dated November 14, 1899.

Application filed July 8, 1899. Serial No. 723,190. (No model.)

*To all whom it may concern:*

Be it known that I, ROBERT W. JAMIESON, of Rochester, in the county of Monroe, State of New York, have invented certain new and useful Improvements in Running-Gear for Vehicles; and I do hereby declare the following to be a full, clear, and exact description of the same, reference being had to the accompanying drawings, forming a part of this specification, and to the reference-numerals marked thereon.

My present invention has for its object to provide a running-gear adapted to be employed particularly upon that class of vehicles known as "automobiles" and to provide a construction whereby the forward or steering wheels may be adjusted simultaneously and rotated upon their vertical axis at any desired angle to the frame, and has for its further object to provide a means whereby when either steering-wheel is elevated above the other, as in mounting an obstacle in the road, the axle to which the said wheels are connected may be permitted to tilt without unevenly raising the body of the vehicle.

To these and other ends my invention consists in certain improvements in construction and combinations of parts, all as will be hereinafter described and the novel features pointed out in the claims at the end of this specification.

In the drawings, Figure 1 is a top plan view of the running-gear of a vehicle constructed in accordance with my invention; Fig. 2, a front end elevation; Fig. 3, an enlarged top plan view of the forward portion of the frame and steering-wheels; Fig. 4, a plan view of one end of the wheel-axle; Fig. 5, a side elevation of the same; Fig. 6, a sectional view on the line 6 6 of Fig. 4; Fig. 7, a plan view of a modification; Fig. 8, a side elevation thereof; Fig. 9, a sectional view taken on the line 9 9 of Fig. 7, and Fig. 10 a sectional view of a modification.
Similar reference-numerals indicate similar parts.

In constructing a vehicle-frame in accordance with my invention I employ the axles 1 and 2, supported upon their opposite extremities in the front and rear sets of wheels (indicated by 3 and 4, respectively) and united by the reach composed of the tubular rods 5, rigidly secured at 6 6 to the rear axle, and at their forward ends united by brackets 7 and 8, secured rigidly to said rods by brazing or otherwise. The bracket 7 connects the rods in rear of their extreme ends, and the bracket 8 embraces said ends where they are brought together, thus forming a triangular reach or frame of great strength.

The forward axle 1 is constructed in the form of a truss-frame to insure rigidity and lightness, consisting of the cross-bar 9, arranged centrally upon the axle 1 and extending transversely thereof, and the tie-rods 10, extending from the extremities of the bar to the lugs 11 near the outer ends of said axle. Formed upon the under sides of the couplings or brackets 7 and 8 are downwardly-extending lugs or extensions 12, in which the opposite ends of the bar 9 are journaled in any suitable manner.

The body of the vehicle may be mounted upon and secured to the frame in any suitable manner, with the usual or any preferred construction of springs interposed between the body and frame adapted to reduce the jolting and vibration between the parts. As far as the mounting of the forward axle is concerned, it is not essential that a triangular reach-frame be employed, as any construction of frame which would permit the separation of the pivot-points of the axle sufficiently to prevent its twisting relative to the frame might be employed; but I prefer the described construction, as it simplifies and strengthens the parts. The utility of providing for a vertical movement between the vehicle-body and the forward axle is at once apparent, as the vehicle in traveling over a rough or uneven road-bed is not materially affected by the elevation of either wheel in surmounting some obstruction or by dropping into a rut or other depression in the road.

The steering or directing of the vehicle is accomplished by means of the forward wheels 3 3, carried upon stud-axles arranged upon the extremities of the front axle 1 and by a construction to be presently described secured thereto in such a manner that as the wheels are moved at an angle relative to the axle their pivot-points will lie in the centers of the wheels—that is, the latter will be turned upon a perpendicular erected at or near the point of contact between the wheel and the ground.

In the preferred embodiment of my invention I provide upon the inner ends of each of the stud-axles 14 a segmental channel-box 15, having the flanges 16 upon its outer face and the slot 17 between them. This channel-box is curved upon an arc having its center lying in the center of the wheel-hub of the wheel, heretofore described, and upon the stud-axles are spindles or bearings 18, which may be of any desired construction adapted to fit within the hub of the wheel, permitting the free rotary movement of the latter, ball-bearings being employed, if desired. Arranged upon each end of the axle 1 is a segmental head 20, upon which the channel-box 15 is adapted to fit and slide. As before described, the channel-box is curved, and the turning of the wheel into an angular position with relation to the axle 1 is accomplished by adjusting the channel-box 15 of the stud-axle on the said head 20, which will cause the wheel to turn or pivot on a center near its vertical axis. If it is desired to have the wheels operate in the same manner as the steering-wheels of bicycles, in which the center of movement of the wheel is inclined slightly from the perpendicular, it is only necessary to tilt the segmental bearing members at a slight angle to the horizontal, as shown in Fig. 10. In order that the parts may be readily operated into any desired position, I employ roller-bearings between the engaging surfaces, the channel-box 15 being formed with a considerable breadth, as shown, in order to be firmly supported on the axle 1, and upon the opposite sides of the head 20 I provide rollers 21, supported upon suitable bearings in lugs or ears 22 and adapted to bear upon the inner sides of the box 15 and flanges 16. Arranged upon the upper side of the head are rollers 23, supported upon studs or pins 24, journaled in recesses or apertures 25, said rollers bearing against the upper side of the channel-box 15, as shown particularly in Fig. 6. The arrangement, as above described, greatly reduces the friction between the parts, and to compensate for any wear that may occur, as well as to provide a means of adjustment, I employ a plate 26, lying in the bottom of channel-box and adjusted by a series of set-screws 27, threaded into the lower side of the box, by which the desired adjustment may be obtained and any wear compensated for. The stud-axles thus constructed are connected for simultaneous operation by short arms 28, located upon the channel-box 15 and provided with a foot 29, which is secured by bolts 30 to the flanges 16, extending to the rear of stud-axles, and are connected by rods 31, pivoted at 32 to the ends of said arms 28 and at 33 to a lever 34, rigidly connected to and operated by the steering-post 35, journaled on a bearing 36 in the axle 1, which extends upward and is accessible from the vehicle-body. A movement of the post 35 in either direction is communicated to the stud-axles through the arms 28 by means of the lever 34 and connecting-rods 31, adjusting the wheels to the desired position.

I have shown a modified form of my device in Figs. 7 to 9, in which the arrangement of the stud-axles and bearings is reversed. In this construction the channel-box 15' is formed upon each end of the axle 1 and the adjusting-lever 28' is located upon the stud-axle between the head 20' and the spindle or bearing 18. The axle 1 is provided upon each extremity with the channel-box 15', in which the head 20' upon the stud-axle operates. Said head is provided with the rollers 21' upon opposite sides thereof, and small rollers 23', journaled between lugs 40, arranged upon the upper side of the channel-box 15 and operating through apertures 41, bear against the upper side of the head 20, as shown particularly in Fig. 9.

The operation of the device will now be understood. When the operator desires to steer the vehicle in any desired direction, he revolves the steering-post 35 and by means of the lever 34 and connecting-rods 31 moves the levers 28, which, being attached rigidly to the boxes on the short axles, will shift the latter on the heads 20, and owing to the curved construction of the heads and boxes the wheels will be rotated in approximately a vertical plane.

By arranging the steering device with the pivot-point upon which the wheels are turned coincident with their vertical axes the steering may be accomplished easily and is not affected by an increase in the loading of the vehicle. The constant jerking movement of the steering mechanism occasioned by either of the wheels encountering slight obstacles in their paths is also eliminated, and as a further advantage of this construction the wear upon the tires of the steering-wheels occasioned by the crowding or side straining of the latter as the steering-wheels are adjusted is reduced to a minimum.

I claim as my invention—

1. In a vehicle steering mechanism, the combination with a frame and an axle mounted thereon, of the short stud-axles connected to the axle outside of the hubs of the latter and arranged to turn on centers within the wheels, the arms on the stud-axles, a steering-post and connections between the latter and the arms, whereby the stud-axles may be operated simultaneously.

2. In a running-gear for vehicles, the combination with the reach-frame having the rear axle secured thereto, and the brackets connecting the members of the frame, of the forward axle having the central cross-bar, the truss-rods extending from the cross-bar to the ends of the axles, and pivotal connections between the ends of the cross-bar and the brackets.

3. In a vehicle steering device, the combination with an axle secured to the vehicle-frame and having upon its opposite extremities bearing members, of short stud-axles supported in the wheels and provided with coöperating members engaging the former members for entirely supporting the wheels exterior of the hubs and adapted when operated thereon to cause the steering-wheels to be turned upon their vertical axes upon vertical centers falling within the hubs of the wheel.

4. In a vehicle steering device, the combination with an axle secured to the vehicle-frame, having arranged upon each of its opposite extremities one member of a segmental bearing struck from a center within the wheel-hubs, of short stud-axles supported entirely in and by the wheels and provided upon their inner ends with a coöperating bearing member adapted to engage within the former member, and means for causing the simultaneous adjusting of the wheels.

5. In a vehicle steering device, the combination with an axle secured to the vehicle-frame provided upon each of its extremities with a stationary segmental or arc-shaped bearing member, of short stud-axles having upon their inner ends coöperating bearing members adjustable upon the former, wheels on the stud-axles, and connections between the stud-axles for causing their simultaneous operation in the same direction, both said segmental members being formed on curves having the center of the wheels as centers.

6. In a vehicle steering device, the combination with an axle secured to the vehicle-frame provided upon each of its extremities with a stationary segmental bearing member, of stud-axles having upon their inner ends coöperating segmental bearing members movable upon the other members, and arms extending from the stud-axles, and a steering-post arranged intermediate the arms, and connections between the latter and the post.

7. In a steering mechanism for vehicles, the combination with the frame having an axle mounted thereon provided upon its extremities with segmental heads, of the wheels, the stud-axles on which they are mounted, each having a segmental channel-box adapted to slide on the head, said channel-boxes and heads being formed on curves of which the centers of the wheels are the centers.

8. In a steering mechanism, the combination with the frame, the axle, and the wheels, the stud-axles mounted upon the ends of the main axle entirely exteriorly of the wheel-hubs, of the bearing arranged intermediate the main and stud axles, consisting of the segmental channel-box secured to one of the parts, having the opening upon its outer face and the head secured upon the other part provided with rollers and adapted to be operated in the said channel-box.

9. In a running-gear for vehicles, the combination of the rear wheels, the rear axle supported thereon, and the frame connected thereto, of the forward axle pivoted to the frame to permit a vertical movement of its ends, and the forward wheels provided with the stud-axles connected to the extremities of the forward axle exteriorly of the wheel-hubs, but turning on substantially vertical axes within the wheel-hubs.

10. In a running-gear for vehicles, the combination of the rear wheels, the rear axle supported therein and the frame connected thereto, of the forward axle pivoted to the frame to permit a vertical movement of its ends, and the forward wheels provided with the stud-axles pivotally connected to the axle, entirely exteriorly of the wheel-hubs and adapted to turn on centers within the wheel-hubs, said stud-axles having the arms, the steering-post arranged between the arms, and connections arranged between the latter and the steering-post to cause the simultaneous operation of the wheels in the same direction.

11. In running-gear for vehicles, the combination with a support having segmental guides thereon, of the wheels and the stud-axles on which the wheels are mounted, having portions movable on said segmental guides, said guides being formed on curves having their centers in a plane extending through the centers of the wheels, and near the point where they contact with the ground, the connections between the support and stud-axles being entirely exteriorly of the wheel-hubs.

12. In a running-gear for vehicles, the combination with a support having the segmental guides thereon, of the wheels, the stud-axles on which they are mounted operating on the guides, said guides being formed on curves having their centers in a plane extending through the centers of the wheels, and near the point where they contact with the ground, and means for turning said stud-axles simultaneously, the connections between the support and stud-axles being entirely exteriorly of the wheel-hubs.

13. In a running-gear for vehicles, the combination with the reach-frame, the trussed axle pivoted thereto to permit its ends to move in a vertical plane only, and the segmental guides on the ends of said axle, of the stud-axles movable on the segmental guides in approximately a horizontal plane, and the wheels thereon, said segmental guides being formed on regular curves having their centers in a plane passing through the centers of the wheels and near the point of contact with the ground.

14. The combination with a support, of the wheels and connections between the wheels and supports for entirely supporting the wheels located exteriorly of the wheel-hubs for guiding the wheels to turn in substantially horizontal planes on circles struck from centers within the wheel-hubs.

15. The combination with a support, of the wheels, the stud-axles on which the wheels are mounted, and guiding and supporting mechanism between the stud-axles and the support for entirely supporting the wheels, located exteriorly of the wheel-hubs and guiding the stud-axles to turn in substantially horizontal planes on circles struck from centers within the wheel-hubs.

16. The combination with a support, of the wheels and connections between the wheels and supports for entirely supporting the wheels located exteriorly of the wheel-hubs for guiding the wheels to turn in substantially horizontal planes on circles struck from centers within the wheel-hubs and antifriction devices interposed in said connections.

17. The combination of the main axle, the wheels, the stud-axles on which the wheels are mounted, and segmental guides between the stud and main axles located exteriorly of the wheel-hubs, said guides being on curves concentric with the centers of the hub.

ROBERT W. JAMIESON.

Witnesses:
F. F. CHURCH,
G. A. RODA.